Figure 2:
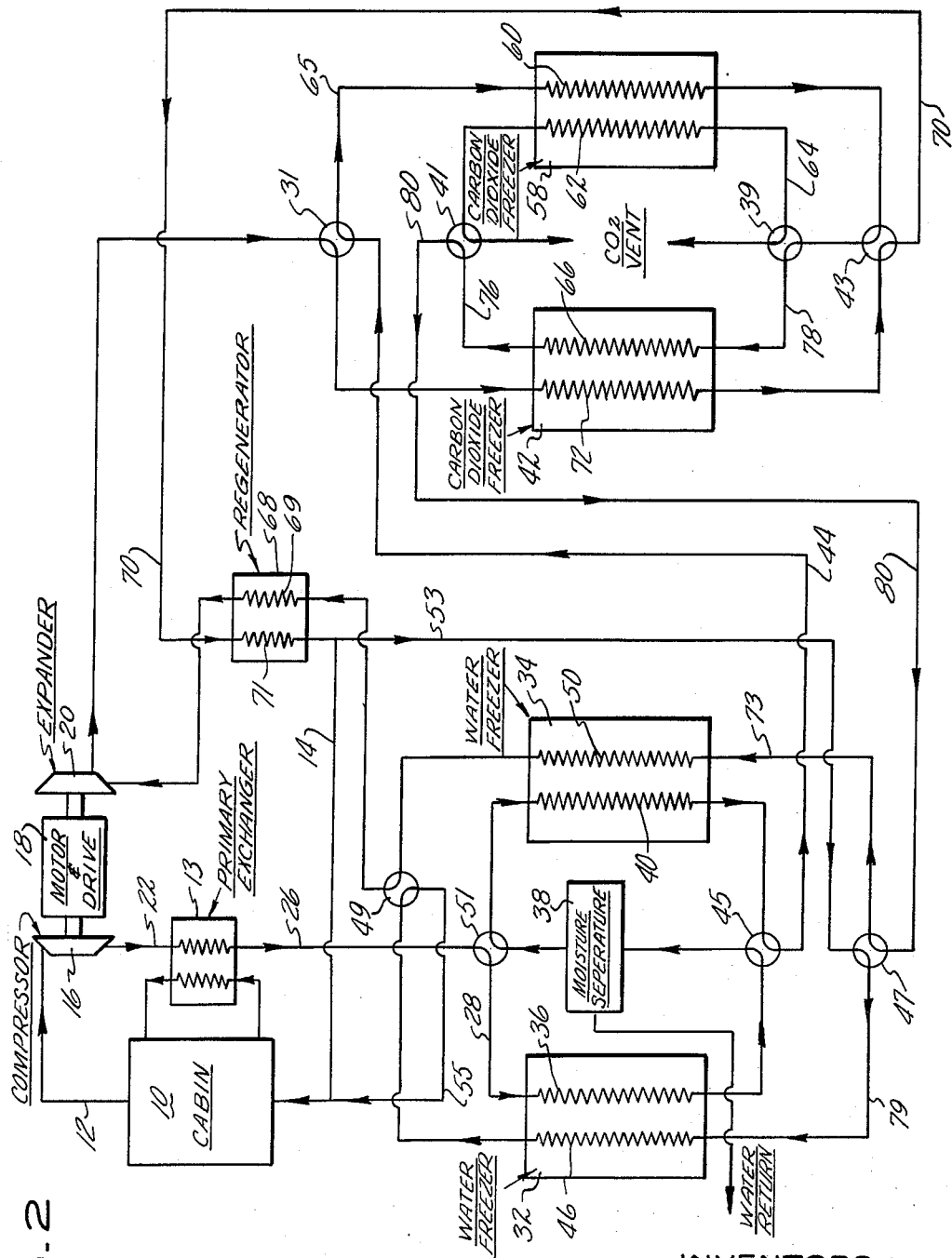

June 11, 1963 G. MELIKIAN ET AL 3,093,470
CO₂ FREEZEOUT SYSTEM
Filed June 28, 1960 3 Sheets-Sheet 1
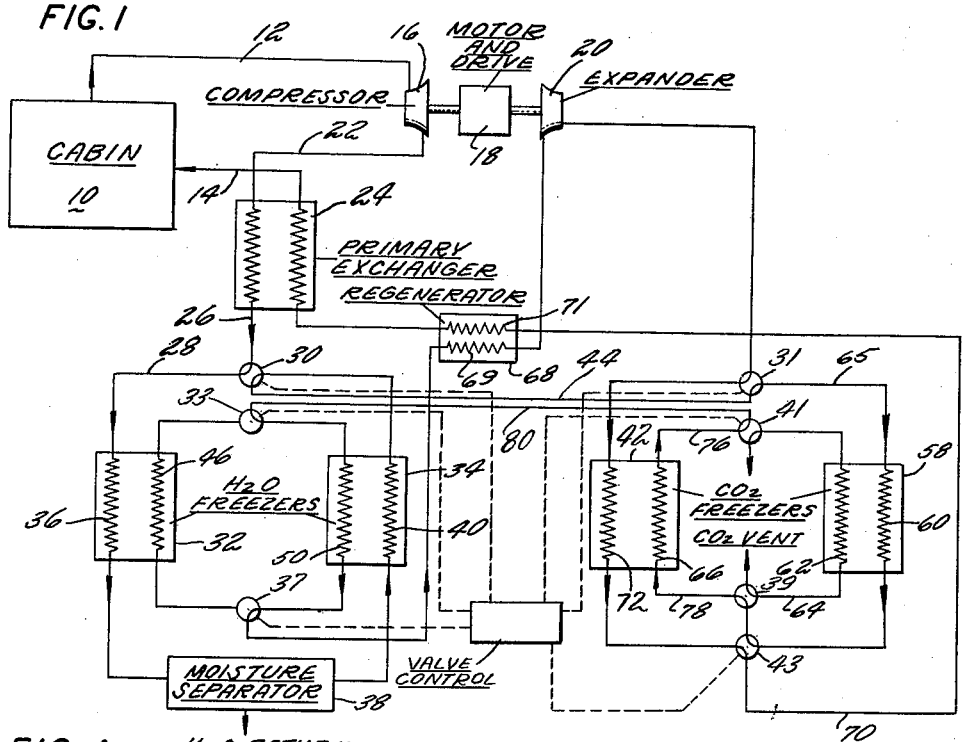
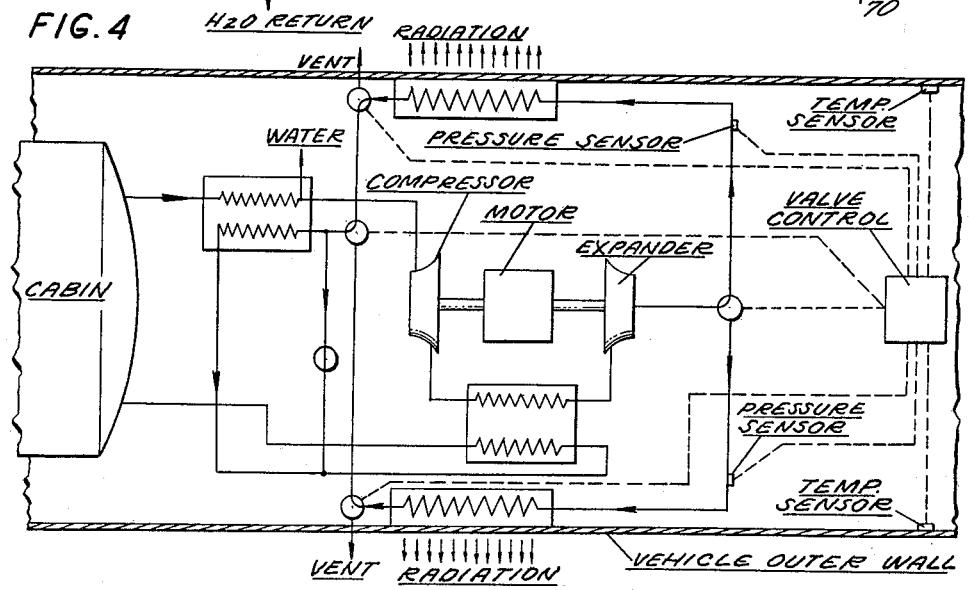
INVENTORS
GORKEN MELIKIAN
GEORGE T. PETERS
BY Norman Friedland
AGENT INVENTORS
GORKEN MELIKIAN
GEORGE T. PETERS
BY Norman Friedland
AGENT June 11, 1963 G. MELIKIAN ET AL 3,093,470
CO₂ FREEZEOUT SYSTEM
Filed June 28, 1960 3 Sheets-Sheet 3

INVENTORS
GORKEN MELIKIAN
GEORGE T. PETERS
BY Norman Friedland
AGENT

United States Patent Office 3,093,470
Patented June 11, 1963

3,093,470
CO₂ FREEZEOUT SYSTEM
Gorken Melikian, Springfield, Mass., and George T. Peters, Hartford, Conn., assignors to United Aircraft Corporation, East Hartford, Conn., a corporation of Delaware
Filed June 28, 1960, Ser. No. 39,366
7 Claims. (Cl. 62—39)

This invention relates to an environmental control system for a closed compartment which is occupied by one or more human beings, and more particularly to a system for extracting carbon dioxide from the artificial atmosphere of such a sealed cabin in order to limit the concentration of carbon dioxide to a level compatible with support of human life. It is fundamentally important in such a sealed compartment, as, for example, in an outer space vehicle, to provide means for reconditioning the air so as to preserve a habitable atmosphere with regard to physical state and chemical composition, and an essential requirement is found in the need to remove carbon dioxide at a rate substantially equivalent to the rate at which it is generated by the human occupants.

Industrial operations, particularly those concerned with the synthesis or purification of certain gas mixtures of gases, have employed various types of systems for removal of carbon dioxide, including methods of chemical absorption, adsorption, liquefaction, and freezout, but their concern has been primarily with removal of carbon dioxide within economic considerations pertinent to operations on or near the surface of the earth, where power required and equipment weight are not of the same degree of importance as in a space vehicle. Therefore, it is an object of this invention to provide a carbon dioxide freezeout system which lends itself particularly to the requirements of a space vehicle and is characterized by high thermodynamic efficiency, low power consumption, and inherently low system weight so as to avoid undue penalties to the overall performance of a manned space vehicle.

It is still a further object of this invention to remove carbon dioxide from the contained atmosphere by a system as described at a rate substantially equivalent to the rate at which it is being introduced into the closed compartment atmosphere by the exhalations of the human occupants, that is to say that the concentration of carbon dioxide will not for any significant period of time exceed a previously established maximum allowable concentration level. This may be accomplished either by continuous or intermittent operation of the system.

It is an important feature of this invention to utilize the heat which is extracted from the processed atmosphere in reducing its temperature to the range in which carbon dioxide will be frozen for reheating this processed atmosphere after carbon dioxide separation and prior to returning it to the closed compartment.

It is a still further object to provide a system in which the processed atmosphere is used as the refrigerant fluid for abstracting heat from the gas cooled and delivering it to the returning gas or other means for heat rejection at temperatures higher than the freezing temperature range of the carbon dioxide removed.

It still is a further object of this invention to provide a system that is unaffected by the gravitational problems normally associated with a zero gravity environment.

It is an object of this invention to provide a freezeout system for the removal of carbon dioxide and water from an air mixture wherein a pair of water freezers cooperates with a pair of carbon dioxide freezers in alternate relation with each other in such a manner that substantially all of the moisture is removed from the air prior to being admitted to the carbon dioxide freezers.

It is another object of this invention to utilize cabin air as the only working fluid and in such a manner to minimize entropy rises and consequently power requirements by the use of small temperature difference regenerative heat exchangers and freezers.

It is the object of this invention to provide a system of maximum reliability in that all of the water and carbon dioxide which is condensed is done so in single separate locations with no subsequent build-up of water and carbon dioxide in any other portion of the system.

Upon reviewing the description which is made in conjunction with the following drawing, one skilled in the art will readily realize that various modifications may be made without departing from the spirit and scope of this invention.

FIG. 1 diagrammatically illustrates a preferred embodiment of this invention including a system for removing both water and carbon dioxide.

FIG. 2 is a schematic illustration of another embodiment of this invention.

Figure 3:
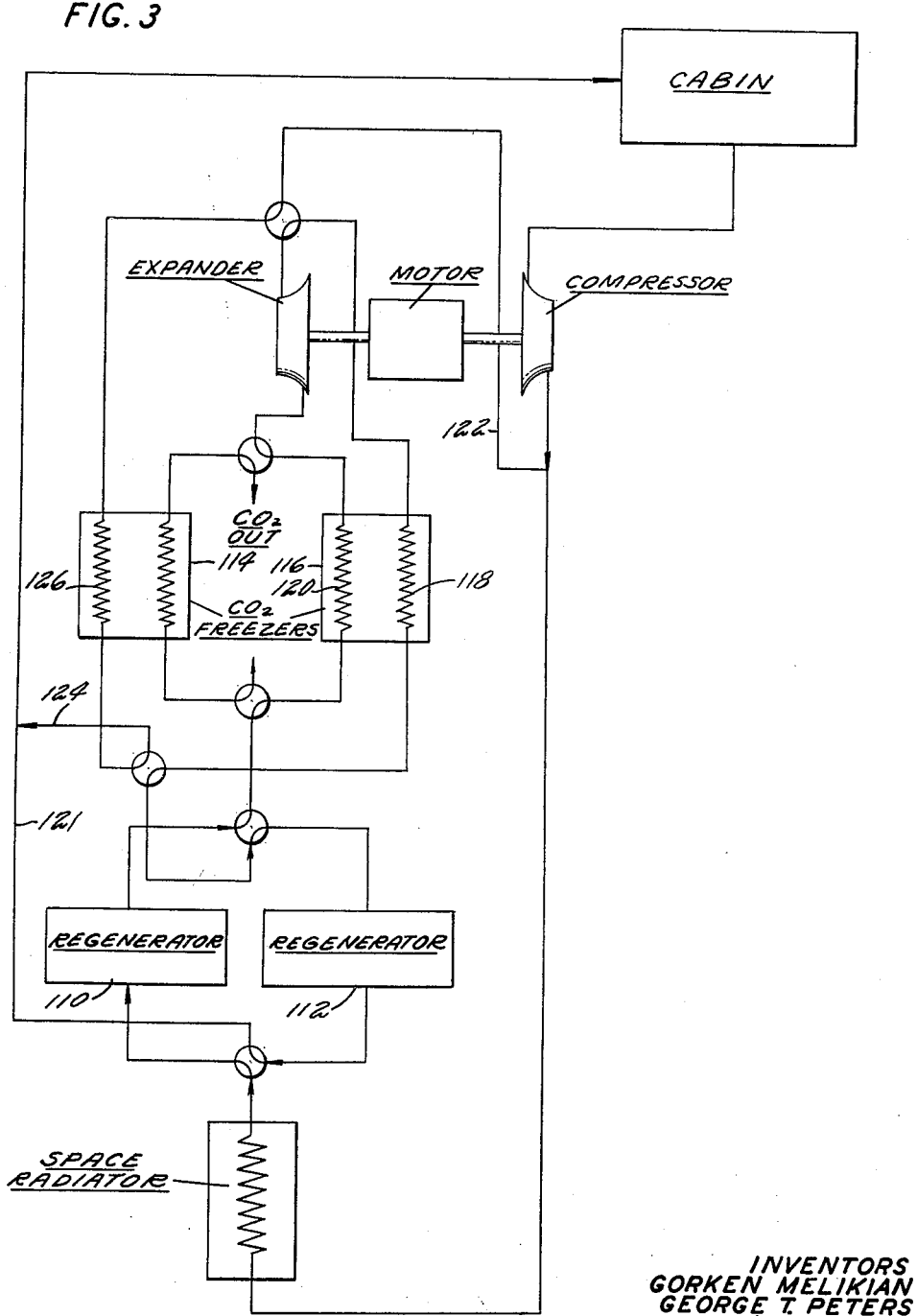

FIG. 3 diagrammatically illustrates another preferred embodiment which utilizes a pair of regenerators selectively connected with a pair of carbon dioxide freezers.

FIG. 4 diagrammatically illustrates this invention and utilizes a plurality of space radiators which form or are incorporated in a portion of the wall of a spaced vehicle.

Referring more particularly to FIG. 1, a cabin generally indicated by numeral 10 is shown to have inlet conduit 14 and exit conduit 12 connecting a water and carbon dioxide freezeout system. The word cabin in this instance has been selected for the convenience of terminology and is to be understood that compartments, cabins, or the combination thereof is equally applicable. Air which has been contaminated by the exhalation of the occupants within the cabin is extracted by compressor 16 which is driven by the combination of motor 18 and expander 20 which may take the form of any of the well known positive or non positive displacement expansion motors. As will be appreciated from the following description, the compressor and expander are connected in bootstrap relationship, that is to say that the air which is being compressed is subsequently used to propel the expander in such a manner that energy is expended from the compressed air so as to be substantially adiabatically expanded, which results in a substantial temperature drop. Of course, a portion of the power for compression is supplied by the expander while the remainder portion may be supplied by an electrical motor or any other suitable means. As the air leaves the compressor, it is precooled by primary heat exchanger 24 and directed therefrom to the water freezer by 4-way valve 30 which connects line 26 to line 28. It will be realized that while one set of freezers is utilized for removing water and carbon dioxide from the air stream, the second set is being regenerated and held in a stand-by condition until a predetermined time so as to allow either one of the freezer systems to complete its cycle. The method for automatically cyclically connecting the water freezers to the carbon dioxide freezers is well known in the art, while it should be realized that routing the carbon dioxide discharged air to the water freezers is an important feature of this invention as will be more fully appreciated from the description to follow.

Still referring to FIG. 1, the precooled compressed air is passed through passage 36 of heat exchanger 32 for condensing its moisture and for melting the ice which has accumulated from the previous cycle and leaves therefrom at a temperature, say 35° F. The moisture is in turn fed to moisture separator 38 where the moisture is collected in any of the well-known types and in such a manner so as not to interfere with the air stream which is directed to passage 40 of heat exchanger 34 for further cooling of the air. The purpose of this operation is to assure that the air fed to the carbon dioxide freezeout system is substantially free of all of its moisture content. Owing to the fact that the air in passage 50 which has previously been in communication with the carbon dioxide freezers is at a low temperature; the temperature of the air in passage 40 which is in heat transfer relation thereto will be reduced to say, −150° F. The air, now essentially free of its moisture, is then fed to passage 60 of heat exchanger 58 which is in out-of-contact heat relation with the fluid in passage 62 which has accreted with frozen carbon dioxide from the previous cycle. The temperature of the air in passage 60 is descreasing, due to the transfer of heat to passage 62 which causes the rate of sublimation of the carbon dioxide to increase. The sublimed carbon dioxide is then vented out of the system to a low pressure or zero pressure environment via line 64 and 63. The now colder air is admitted to freezer 42 where a major fraction of the carbon dioxide in the processed air freezes and accretes within passage 66. The air which is now at a low temperature say, −240° F., is fed to passage 50 of freezer 34, taking up some of the heat released by freezing the water in passage 40 as previously mentioned and then fed through regenerator heat exchanger 68 for recooling the air and then to expansion motor 20 for further cooling of the air. The air is then delivered to freezer 42 where it is utilized for bringing down the temperature of the air contaminated with carbon dioxide in passage 66 for the purpose of condensing and separating carbon dioxide as previously mentioned. The air is then delivered to the cabin via passage 70 passing through regenerator 68 and primary heat exchanger 24 and picking up heat through each one of these devices.

From the foregoing, it is apparent that a large portion of the energy which has been expended in lowering the temperature of the carbon dioxide and water contaminated air is regained by precooling the air stream at various locations in the cycle, prior to readmittance to the cabin. Although not shown, the water collected in the moisture separator 38 may be ejected into the cabin for rehumidification purposes or collected and used in liquid form. It is an important feature of this invention that the sublimated carbon dioxide is venting without incurring an appreciable loss of water, which in a space vehicle, is a valuable commodity.

Upon reaching a predetermined load in the freezers, the activated freezers may be automatically or cyclically connected in the following manner. As shown in FIG. 1, a valve control schematically illustrates mechanism which serves to sequentially rotate valves 30, 31, 33, 37, 39, 41 and 43 so as to alternate the flow path. Such mechanisms are well known in the art and a detailed description thereof is not necessary for a complete understanding of the present invention. Although it is to be understood that the water freezeout system and carbon dioxide freezeout system may be cycled independently of each other, the air discharging from primary heat exchanger 24 is directed to passage 40 of freezer 34 and melting frozen water which had accumulated therein and passing the moisture laden water through the moisture separator 38 and then to passage 36 of heat exchanger 32 and delivering the air at a lower temperature through passage 72 of freezer 56. At this point the air rejects heat from the carbon dioxide laden passage 66 which now provides means for increasing the rate of sublimation therein so as to increase the process of venting the carbon dioxide via passages 76 and 78 to a low or zero pressure environment. The now cooler air discharging from freezer 42 is delivered to passage 62 of freezer 58 where heat is absorbed therefrom causing condensation of the carbon dioxide within the chamber of the freezer. The carbon dioxide free air is then delivered via passage 80 to passage 46 of heat exchanger 32 which supplies the low temperature sink for bringing the dew point temperature of the moisture laden air in passage 36 to say, −150° F. At this point the air discharging from passage 46 is slightly warmer and is again precooled at regenerator 68 and delivered to expander 20 for further lowering of its temperature prior to delivery to passage 60 of heat exchanger 58. From this point the air is then redelivered to the cabin via line 70, regenerator 68, heat exchanger 24, and line 14 absorbing heat in each one of these heat transfer devices. Reversing exchangers and their operation are well known in the art and may be operated either manually or automatically.

Another exemplified system is shown in FIG. 2 which is substantially similar to FIG. 1 which has been modified in its preferred form in such a manner as to more effectively utilize the heat transfer effectiveness of the water freezers. As will be noted as shown in FIG. 1 on alternate cycles, passages 46 and 50 of heat exchangers 34 and 36 respectively have been dead-ended. In order to utilize the heat transfer effectiveness of these heat exchangers, the flow path of the embodiment shown in FIG. 2 has been arranged so that fluid is continuously flowing through these passages in such a manner as to be in heat transfer arrangement so as to precool the air prior to freezing the moisture content. As will be noted, another valve and associated connecting conduits have been included to divide the flow in line 14 for bleeding cool air via lines 53 and 79 and alternately via lines 53 and 73 so as to take advantage of the low heat content within the water freezers. It will also be noted that the manner of feeding the air stream to the water freezers has been modified by alternately connecting the primary heat exchanger discharge air in line 26 to passages 36 and 40 in freezers 32 and 34 respectively. It will further be noted that these passages are alternately connected to the moisture separator. This arrangement makes possible the use of a much smaller and consequently lighter weight heat exchanger generally indicated by numeral 13. This heat exchanger may be entirely eliminated but is shown in this particular embodiment because with its inclusion the component units such as the freezers and expanders may be utilized at lower efficiencies and also making the system operable over a wide range of temperature conditions.

Still referring to FIG. 2, during this cycle of operation, cabin air pressurized by the compressor is discharged into line 22 and directed to passage 36 of water freezer 32 by way of line 26 and valve 51. The air is precooled in the passage and is delivered to passage 40 of water freezer 34 by way of valve 45, water separator 38 and valve 51. The water separator serves to remove a major portion of the water entrained in the cool air. Since passage 40 is in heat exchange relation with passage 50, which contains cold purified air issuing from the carbon dioxide freezer; the air therein is further cooled before being delivered to the carbon dioxide freezer via line 44. In this manner adequate precaution is taken to assure that the air being delivered to the carbon dioxide freezer is substantially free of all its moisture content. To precool the air in passage 36 during this cycle of operation, purified air being returned to the cabin via line 14 is partially vented through branch line 53 and directed to passage 46 of water freezer 32 by way of valve 47. The issuing air is returned to the cabin by way of valve 49, line 55 and line 14.

To alternate the flow path, valves 49, 51, 45 and 47 are rotated so that freezer 34 becomes the precooler and freezer 32 directs the substantially moisture free air to the carbon dioxide freezer through line 44. In this cycle of operation the cool air issuing into branch line 53 is directed to passage 40 by way of valve 47 and passage 73 and returned to the cabin by way of valve 49 and line 55. The carbon dioxide freezers may or may not be alternated during this cycle of operation.

In accordance with this invention, an example of the condition of the air as evidenced in each component is included hereinbelow for illustration purposes. The following will be evidenced when the compressor efficiency is 90%, the expander efficiency is 85%, regenerative heat exchanger effectiveness is 90%, and the freezer effectiveness is 90%. Referring to the embodiment shown in FIG. 2 in conjunction with the embodiment of FIG. 1 and assuming the following conditions to exist in the cabin.

$$T = 35.0$$
$$P = 5.0$$
$$W_1 = 1.282$$
$$W_2 = 2.16$$

where

T is the temperature in degrees Fahrenheit
P is the absolute pressure in pounds per square inch
$W_1$ is the weight percentage of carbon dioxide in contaminated air
$W_2$ is weight percentage of water in the contaminated air The condition of system components are:

At the compressor discharge—
$$T = 222.0$$
$$P = 14.0$$

At primary heat exchanger discharge—
$$T = 218.50$$
$$P = 13.99$$

At the water freezer in discharge passage 46—
$$T = 35.0$$
$$P = 13.79$$
$$W_2 = 1.705$$

At the inlet of water freezer passage 50—
$$T = 35.0$$
$$P = 13.78$$
$$W_2 = 0.455$$

At the discharge of the same—
$$T = -160.0$$
$$P = 13.58$$
$$W_2 = \text{essentially } 0$$

At the discharge of passage 60 of freezer 58—
$$T = -179.0$$
$$P = 13.68$$

At the discharge of passage 66 of freezer 42—
$$T = -206.0$$
$$P = 13.48$$
$$W_1 = 0.47$$

At the discharge of passage 40 of freezer 34—
$$T = 11.0$$
$$P = 13.38$$

At the discharge of passage 69 of regenerator 68—
$$T = -165.0$$
$$P = 13.37$$

At discharge of expansion motor 20—
$$T = -230.7$$
$$P = 5.31$$

At the discharge of passage 72 of freezer 42—
$$T = -183.9$$
$$P = 5.11$$

At the discharge of passage 71 of regenerator 68—
$$T = 8.0$$
$$P = 5.1$$

At the discharge of passage 36 of freezer 32—
$$T = 209.5$$
$$P = 5.07$$

From the foregoing example, it will be apparent that the temperature differential across the heat transfer portion of all the freezers, heat exchangers, and regenerators, which are all in their preferred form of the counterflow type, is at a substantially low value so that the efficiency of the respective heat transfer devices will evidence a minimum of entropy rises. As a result, a substantial reduction of the power requirements is realized.

Referring to FIG. 3 which shows another exemplary embodiment of this invention which particularly includes a pair of regenerators 110 and 112 which are alternately connected to freezers 114 and 116 and cyclically freezing carbon dioxide and venting the sublimed carbon dioxide. To facilitate in the explanation of this embodiment, explanation of the major parts which have already been described in the above, have been omitted. It will be noted that a space radiator, which may be mounted so that one of its surfaces forms a part of the outer skin of a spaced vehicle, is utilized for extracting a portion of the heat in order to reduce the temperature of the air prior to delivery to the regenerator. The regenerator serves to extract heat from the air passing therethrough and retaining this heat in a manner well known in the art and then delivering the lower temperature air to carbon dioxide freezer. In one cycle, for example, air in the carbon dioxide freezer 116 is condensed and the solid carbon dioxide accretes on the wall of the freezer whereupon carbon dioxide free air is then delivered to the expander, where its temperature is reduced and passed through passage 118 which is in out-of-contact heat relation to passage 120 for absorbing the energy for condensing the carbon dioxide. The air is then alternately passed to the regenerator which has previously been heated and then returned to the cabin via passage 120. Simultaneously, the inactive freezer 114 is connected to the compressor discharge air via passage 122 where it mixes with the carbon dioxide free air in line 20 by way of line 124 which was in communication with passage 126 of freezer 114. At this point the warmer air serves to increase the rate of sublimation of carbon dioxide which has accreted in freezer 114. When the temperature and pressure of the freezer has reached a predetermined value, the operation is switched so that the carbon dioxide freezer which has collected frozen carbon dioxide is now sublimated and vented out to a low of zero pressure environment, and the freezer which has previously been vented is now connected so as to collect frozen carbon dioxide.

FIG. 4 is another system for removing carbon dioxide by a freezing process wherein the sublimed carbon dioxide is vented out of the system at a rate substantially equal to the rate at which it is being introduced to the cabin. The radiators, which may be mounted to the outer skin of the outer space vehicle, are ideally suited for this particular application as is illustrated by the principle stated in the Stefan-Boltzmann law wherein heat is radiated at the rate in accordance with the following expression:

$$Q = \epsilon A \sigma T^4$$

where $\epsilon$ is an emissivity coefficient
A is surface effective area
T is absolute temperature
$\sigma$ is a fundamental numerical constant Hence, if a gas is passed through a radiator which can reject heat to space and is insulated from other sources of heat, the gas will be cooled. When the liquefaction (or sublimation) temperature of a chemical constituent of the gas is reached, that constituent will change its state and no longer be associated with the previous gas mixture. This type of gas purification process is particularly appropriate to a space vehicle, since, except in the direction of the sun or a planet, the heat receiver is essentially all space to infinity, with a receiver equivalent temperature of zero absolute.

Thus, carbon dioxide and water may be condensed from vapor to solid states, whence they will be separated from the cabin atmosphere by passage through the radiator.

The precooler(s) and the compressor-heat-exchanger-expander unit permit a reduction in the amount of heat which will need to be abstracted by radiation, hence realizing a reduction in the size of the radiator, as well as providing the possibility of separately recovering and disposing of the water and the carbon dioxide. The radiators may be connected in parallel relation to each other so as to be adapted for automatically actuating the one exposed to the lowest temperature.

Reference is hereby made to application Ser. No. 39,385, filed June 28, 1960, by W. E. Arnoldi and application Ser. No. 39,367, filed June 28, 1960, by D. C. Jennings, both of which are assigned to the same assignee.

What has been shown in this invention are systems which are capable of removing water and carbon dioxide at a rate substantially equal to the rate in which it is being injected into the system by the exhalations of the human occupants occupying the cabin. Since the heat which has been extracted for condensing the carbon dioxide is again utilized for reheating the air in its return to the cabin, a lightweight system is evidenced and the power consumed by the operation whether to be for continuous or intermittent operation is held at a minimum, thereby assuring a minimum penalty from both a weight and power standpoint.

It will further be realized that most of the moisture entrained in the air is removed prior to delivery to the carbon dioxide freezers and in such a manner that the water will not be vented along with the carbon dioxide. Also, this permits the use of a smaller and consequently lighter weight heat transfer device. It should be understood that the invention is not limited to the particular embodiments shown and described herein, but that various changes and modifications may be made without departing from the spirit or scope of this novel concept as defined by the following claims.

We claim:
1. In an environmental control system for a sealed compartment containing air subjected to contamination of carbon dioxide, means for separating carbon dioxide from said air by condensation of carbon dioxide to a solid form, said means comprising an air compressor, an expander driving said compressor, a primary heat exchanger to cool air after compression, first, second, third and fourth heat exchangers, means for defining a flow path for successively passing flow from said compartment to said primary heat exchanger to said first heat exchanger to said second heat exchanger to said third heat exchanger to said fourth heat exchanger back to said second heat exchanger and through the expander, said third and fourth heat exchangers adapted to separate carbon dioxide from the cooled air by further cooling and freezing of carbon dioxide, and means defining a return flow path for returning said carbon dioxide free air from said expander through said third heat exchanger and to said compartment whereby the carbon dioxide free air is utilized as the low temperature source for indirect heat exchange with the air in said second heat exchanger.

2. A system for removing carbon dioxide from air contained in a sealed cabin, the combination comprising a compressor, an expander drivingly connected to said compressor, a primary heat exchanger, a water freezeout system including first and second heat transfer devices and a moisture separator, a carbon dioxide freezeout system including third and fourth heat transfer devices, a regenerator heat exchanger disposed between said water and carbon dioxide freezeout systems, means defining a flow path from said cabin to said compressor to said primary heat exchanger to said first heat transfer device to said moisture separator to said second heat transfer device to said third heat transfer device to said fourth heat transfer device back to said second transfer device to said regenerator to said expander back to said fourth heat transfer device back to said regenerator back to said primary heat exchanger and back to said cabin.

3. A system as defined in claim 2 including means for alternating said flow path from said primary heat exchanger to said second heat transfer device to said moisture separator to said first heat transfer device to said fourth heat transfer device to said third heat transfer device back to said first heat transfer device to said regenerator to said expander to said third transfer device back to said regenerator and back to said primary heat exchanger.

4. A system as defined in claim 2 including means for alternating the heat transfer devices of said water freezeout system and the heat transfer devices of said carbon dioxide freezeout system independently of each of said systems.

5. In a system for removing carbon dioxide from air contained in a sealed cabin subjected to the exhalation of its occupants, means for extracting the air from said cabin including a compressor, an expander and motor for driving said compressor, a water freezeout system including first and second heat exchangers and a moisture separator, a carbon dioxide freezeout system including third and fourth heat exchangers, a regenerator having connections to said cabin and said water and carbon dioxide freezeout systems, means defining a first flow path from said cabin to said compressor to said first heat exchanger to said moisture separator to said second heat exchanger to said third heat exchanger to said fourth heat exchanger back to said second heat exchanger to said regenerator to said expander to said fourth heat exchanger back to said regenerator and back to said cabin, and additional means defining a second flow path disposed in parallel relation to said first flow path for successively passing air discharged from said carbon dioxide freezeout system and delivered to said regenerator from the first flow path from said regenerator to said first heat exchanger and back to said cabin.

6. A system as described in claim 5 including means for alternately connecting said additional means for defining said flow path from said regenerator to said second heat exchanger and back to said cabin.

7. A system as defined in claim 5 including a primary heat exchanger disposed intermediately of said compressor and said water freezeout system.

References Cited in the file of this patent

UNITED STATES PATENTS

| | | |
|---|---|---|
| 1,947,616 | Messer | Mar. 6, 1934 |
| 2,089,558 | Karwat | Aug. 10, 1937 |
| 2,116,191 | De Baufre | May 3, 1938 |
| 2,504,051 | Scheikel | Apr. 11, 1950 |
| 2,552,558 | Jenny | May 15, 1951 |
| 2,641,114 | Holthaus | June 9, 1953 |

FOREIGN PATENTS

| | | |
|---|---|---|
| 52,987 | Netherlands | Aug. 15, 1942 |
| 908,021 | France | Aug. 6, 1945 |